(12) United States Patent
Kim et al.

(10) Patent No.: US 11,698,300 B2
(45) Date of Patent: Jul. 11, 2023

(54) OPTICAL SYSTEM CAPABLE OF IMPROVING SPATIAL RESOLUTION OF HYPERSPECTRAL IMAGING AND OPTICAL ALIGNMENT METHOD USING THE SAME

(71) Applicant: ELECTRONICS AND TELECOMMUNICATIONS RESEARCH INSTITUTE, Daejeon (KR)

(72) Inventors: Jeong Eun Kim, Gwangju (KR); Kye Eun Kim, Jeollanam-do (KR); Keo Sik Kim, Gwangju (KR); Hyun Seo Kang, Gwangju (KR); Hyun Jin Kim, Gwangju (KR); Gi Hyeon Min, Gwangju (KR); Si Woong Park, Gwangju (KR); Hyoung Jun Park, Gwangju (KR); Chan Il Yeo, Gwangju (KR); Young Soon Heo, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 17/546,627

(22) Filed: Dec. 9, 2021

(65) Prior Publication Data
US 2022/0252451 A1 Aug. 11, 2022

(30) Foreign Application Priority Data
Feb. 8, 2021 (KR) .................. 10-2021-0017606

(51) Int. Cl.
*G01J 3/02* (2006.01)
*G02B 3/04* (2006.01)
(Continued)

(52) U.S. Cl.
CPC ............. *G01J 3/0208* (2013.01); *G01J 3/021* (2013.01); *G01J 3/18* (2013.01); *G01J 3/2823* (2013.01);
(Continued)

(58) Field of Classification Search
CPC .. G01J 3/0208; G01J 3/021; G01J 3/18; G01J 3/2823; G01J 2003/2826; G01J 3/0229;
(Continued)

(56) References Cited

U.S. PATENT DOCUMENTS 9,030,515 B2 5/2015 Stowe et al.
9,998,800 B2 6/2018 Lee et al.
(Continued)

FOREIGN PATENT DOCUMENTS

KR 101556056 B1 10/2015
KR 101872240 B1 6/2018
(Continued)

*Primary Examiner* — Abdullahi Nur
(74) *Attorney, Agent, or Firm* — Rabin & Berdo, P.C.

(57) ABSTRACT

Provided are an optical system capable of improving the spatial resolution of hyperspectral imaging and an optical alignment method using the same. The optical system includes a digital micromirror device (DMD) having a rectangular shape, a first cylindrical lens curved to focus and form an image on an axis corresponding to a shorter side of the DMD, and a second cylindrical lens curved in the same axial direction as the axis to collimate light reflected from the DMD.

13 Claims, 6 Drawing Sheets

(51) Int. Cl.
    *G02B 27/30*     (2006.01)
    *G02B 26/08*     (2006.01)
    *G01J 3/28*     (2006.01)
    *G01J 3/18*     (2006.01)
    *G02B 3/00*     (2006.01)

(52) U.S. Cl.
    CPC ........... *G02B 3/04* (2013.01); *G02B 26/0833* (2013.01); *G02B 27/30* (2013.01); *G01J 2003/2826* (2013.01); *G02B 2003/0093* (2013.01)

(58) Field of Classification Search
    CPC ...... G02B 3/04; G02B 26/0833; G02B 27/30; G02B 2003/0093; G02B 7/023; G02B 26/0875; G02B 27/0955; G02B 30/52; G02B 27/4227
    See application file for complete search history.

(56) References Cited

U.S. PATENT DOCUMENTS

| | | |
|---|---|---|
| 10,211,596 B2 | 2/2019 | Oh |
| 10,891,721 B2 | 1/2021 | Kim et al. |
| 2003/0226834 A1* | 12/2003 | Ishikawa ............... C23C 16/483 219/121.77 |

FOREIGN PATENT DOCUMENTS

| | | |
|---|---|---|
| KR | 1020190035462 A | 4/2019 |
| KR | 102073186 B1 | 2/2020 |

\* cited by examiner

OPTICAL SYSTEM CAPABLE OF IMPROVING SPATIAL RESOLUTION OF HYPERSPECTRAL IMAGING AND OPTICAL ALIGNMENT METHOD USING THE SAME

CROSS-REFERENCE TO RELATED APPLICATION

This application claims priority to and the benefit of Korean Patent Application No. 10-2021-0017606, filed on Feb. 8, 2021, the disclosure of which is incorporated herein by reference in its entirety.

BACKGROUND

1. Field of the Invention

The present disclosure relates to an optical system capable of improving the spatial resolution of hyperspectral imaging and an optical alignment method using the same.

2. Discussion of Related Art

A digital micromirror device (DMD)-based hyperspectral imaging system of the related art has low spatial resolution because increasing a magnification of an image in a direction of a longitudinal axis (a shorter axis than a traverse axis) is limited due to a DMD having a rectangular shape.

SUMMARY OF THE INVENTION

To address the above-described problem, the present disclosure is directed to providing an optical system capable of improving the spatial resolution of hyperspectral imaging by changing the magnification of an image focused on a digital micromirror device (DMD) by changing an aspect ratio of the image using a cylindrical lens, and an optical alignment method using the same.

According to an aspect of the present disclosure, an optical system capable of improving the spatial resolution of hyperspectral imaging includes a digital micromirror device (DMD) having a rectangular shape, a first cylindrical lens curved to focus and form an image on an axis corresponding to a shorter side of the DMD, and a second cylindrical lens curved in the same axial direction as the axis to collimate light reflected from the DMD.

According to the present disclosure, the optical system may further include a first circular lens configured to form an image from light reflected from an object to be measured, and a second circular lens configured to collimate light emitted after the formation of the image.

The first cylindrical lens may be curved in the axial direction to form an image that is narrow in the axial direction.

The DMD may be programmed according to line patterns such that portions of a formed image are sequentially reflected only from mirrors that are in an on-state.

The DMD may be programmed according to line patterns such that only columns of multiple micromirrors are turned on and the other columns of micromirrors are turned off.

According to the present disclosure, the optical system may further include a spectroscope configured to disperse light collimated by the second cylindrical lens into a spectrum according to a wavelength when the light is incident thereon.

Only some lines of an image reflected from the DMD when the line patterns of the DMD are scanned in an axial direction may be collimated and incident on the spectroscope.

A direction of a groove in the spectroscope may be perpendicular to a pattern scan direction.

According to the present disclosure, the optical system may further include a focusing lens configured to concentrate light diffracted by the spectroscope, and a camera configured to receive the concentrated light, and the camera may collect data obtained for the line patterns of the DMD to obtain a three-dimensional (3D) hyperspectral data cube.

When an active area of the DMD is rotated in an optical axial direction, the first cylindrical lens and the second cylindrical lens may be rotated according to the optical axial direction.

According to another aspect of the present disclosure, an optical alignment method using an optical system for improving the spatial resolution of hyperspectral imaging includes (a) placing a first cylindrical lens curved to focus and form an image on an axis corresponding to a shorter side of a digital micromirror device (DMD) having a rectangular shape, (b) placing a second cylindrical lens curved in the same axial direction as the axis to collimate light reflected from the DMD, and (c) obtaining hyperspectral data by scanning line patterns of the DMD.

(c) may include sequentially reflecting portions of an image, which is formed by programming according to the line patterns, only by mirrors that are on.

(c) may include obtaining data in units of the line patterns and collecting the data for all the line patterns to obtain a three-dimensional (3D) hyperspectral data cube.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
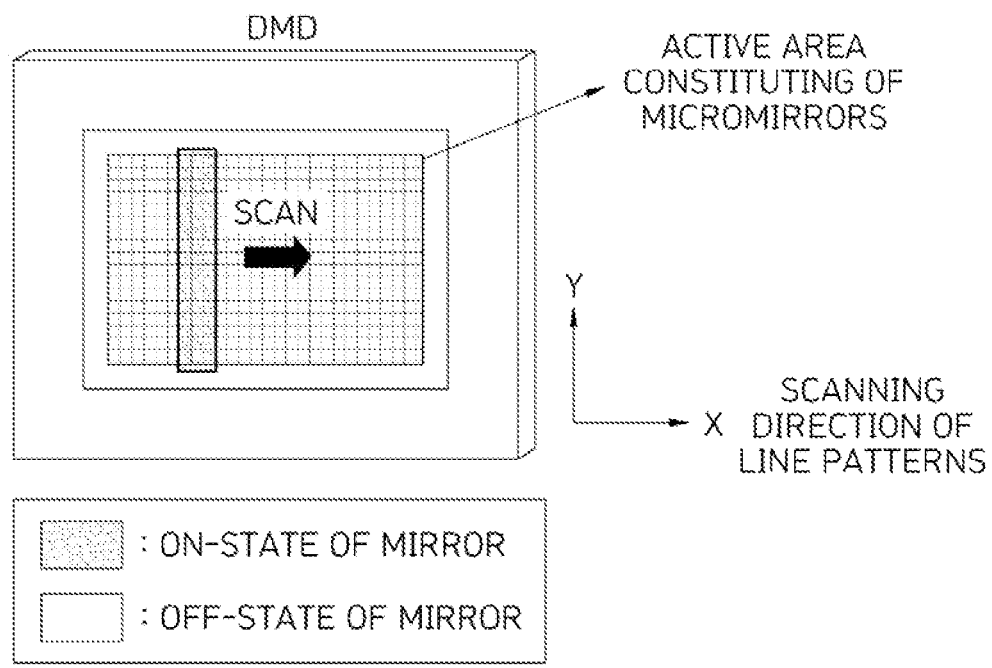
FIG. 1 illustrates scanning line patterns by programming a digital micromirror device (DMD)

The above-described aspects, other aspects, advantages and features of the present disclosure and methods of achieving them will be apparent from the following description of embodiments described below in detail in conjunction with the accompanying drawings.

However, the present disclosure is not limited to the embodiments set forth herein and may be embodied in many different forms and these embodiments are merely provided to help those of ordinary skill in the art easily understand aspects, configurations, and effects of the present disclosure, and thus, the scope of the present disclosure should be defined by the following claims.

The terminology used herein is for the purpose of describing embodiments only and is not intended to be limiting of the present disclosure. As used herein, the singular forms include the plural forms as well unless the context clearly indicates otherwise. As used herein, the terms "comprise" and/or "comprising" specify the presence of stated components, steps, operations and/or elements but do not preclude the presence or addition of one or more other components, steps, operations and/or elements.

Hereinafter, the background art of the present disclosure will be described to help those of ordinary skill in the art understand the present disclosure and thereafter embodiments of the present disclosure will be described.

Hyperspectral imaging is a technique for obtaining both spatial information and spectral information of an object to be measured, whereby a three-dimensional (3D) data cube (x, y, λ) is obtained by combining spectral information of several tens or several hundreds of wavelength channels λ, for each of all pixels of a two-dimensional (2D) image (x, y).

Hyperspectral imaging may be used to analyze the state, features, and configuration of an object to be measured so as to easily identify a material or a defect thereof and has been widely used in the fields of agriculture, geology, medicine, food, etc.

Methods of obtaining hyperspectral imaging data may be divided into a spatial scanning method and a spectrum scanning method. The spatial scanning method is a method of dispersing a spectrum of a particular band while moving according to spatial coordinates of an object, and the spectral scanning method is a method of simultaneously measuring all images of an area to be measured while changing a wavelength.

A pushbroom method, which is a type of the spatial scanning method, is a line scanning method of performing spectroscopic analysis on each line of an object while mechanically moving the object or slits and has been widely used in various fields, but many studies have recently been conducted on a method of replacing mechanical scanning with scanning using a digital micromirror method (DMD).

The DMD is a device that includes several millions of individually controllable micromirrors on CMOS memory cells, and the micromirrors may be individually rotated by ±12 to 17 degrees in an on/off state.

Therefore, the reflection of light from the micromirrors may be controlled by programming an on/off duty cycle of each of the micromirrors and thus the DMD may be used for a variety of applications.

FIG. 1 illustrates scanning line patterns by programming a DMD.

Referring to FIG. 1, line patterns may be scanned in an x-axis direction by turning on only columns of several micromirrors on a left end of an active area of the DMD while the other mirrors are turned off and thereafter turning on columns of several micromirrors starting from a micromirror that is closest to but does not overlap the micromirrors that were turned on.

That is, scanning lines of the DMD serves as mechanical slits in the pushbroom method.

Figure 2:
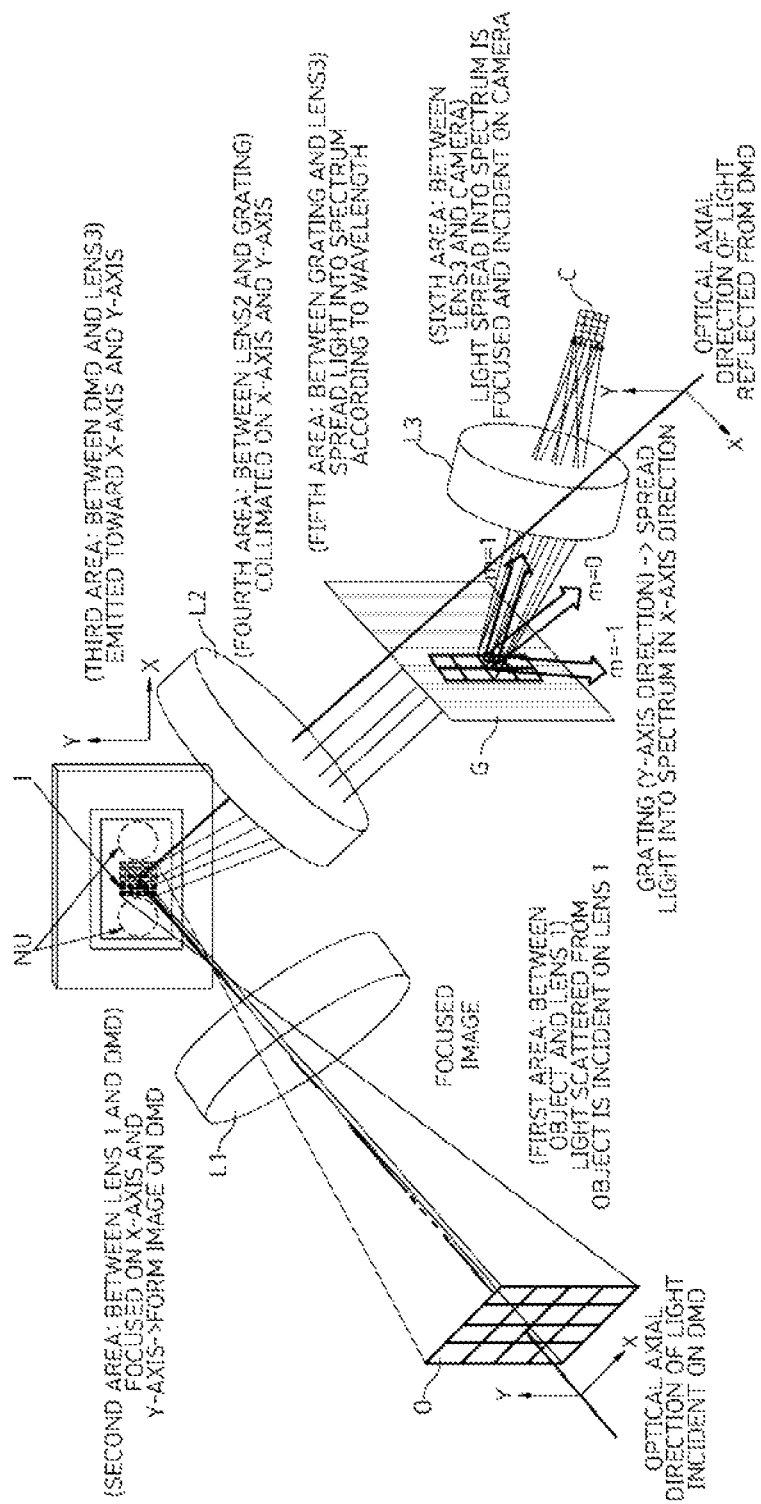
FIG. 2 illustrates a DMD-based hyperspectral imaging system.

FIG. 2 illustrates a DMD-based hyperspectral imaging system.

In a hyperspectral imaging system shown in FIG. 2, portions of light reflected from an object to be measured, which correspond to portions (having a rectangular shape) of an image, are sequentially reflected according to line patterns of a programmed DMD, collimated through a circular lens L2, spread into a spectrum according to a wavelength range through a spectroscope G (a diffraction grid, a prism or the like), focused through a circular lens L3, and detected by a camera C.

In FIG. 2, NU represents part of an active area of the DMD that is not in use, and I represents an image reflected according to the line patterns of the DMD.

An entire 3D data cube (x, y, λ) is formed by capturing a 2D image (y, λ) in a spatial direction and a spectral direction according to one line pattern of the DMD and thereafter capturing another 2D image according to a next line pattern (scanned in the x-axis direction) of the DMD.

Here, lateral spatial resolution of the 3D data cube (x, y, λ) (on the x-axis) becomes higher as a width of a pattern decreases and the magnification of an image increases, and vertical spatial resolution of the 3D data cube (x, y, λ) (on the y-axis) becomes higher as a pixel size of a camera decreases and the magnification of an image increases.

However, as shown in FIG. 2, the active area of the DMD has a rectangular shape with two longer sides, whereas a lens that forms an image has a circular shape with an x-axis side and a y-axis side that are symmetrical to each other, and thus an image should be formed according to the length of the shorter sides (the y-axis sides) of the DMD even when a magnification of the image is to be increased to improve spatial resolution.

As such, when an image is formed according to the short sides of the DMD, an area of part of the long sides (the x-axis sides) on which the image is not formed is large and thus increasing the lateral spatial resolution of hyperspectral imaging is limited.

In relation to a DMD-based hyperspectral imaging system, an embodiment of the present disclosure provides an optical system provides capable of improving the spatial resolution of hyperspectral imaging by changing an aspect ratio of an image formed on the DMD having a rectangular shape to increase the spatial utilization of an active area of the DMD, and an optical alignment method using the same.

Figure 3:
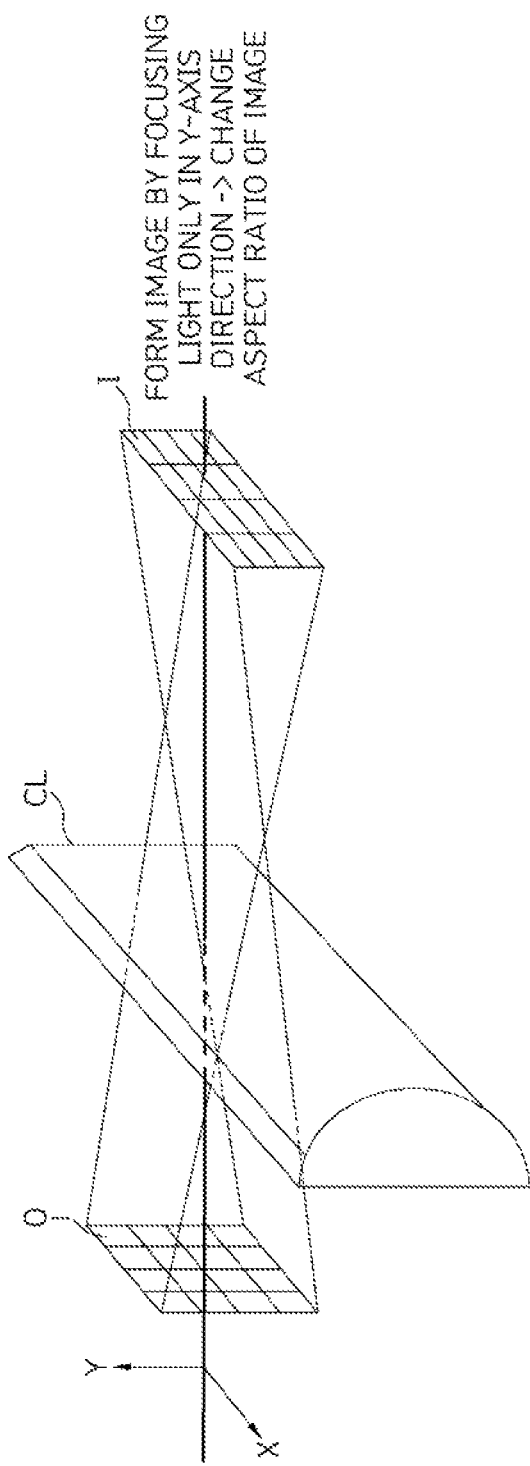
FIG. 3 illustrates the formation of an image through a cylindrical lens curved in a Y-axis direction according to an embodiment of the present disclosure.

FIG. 3 illustrates formation of an image through a cylindrical lens curved in a y-axis direction according to an embodiment of the present disclosure.

According to an embodiment of the present disclosure, a cylindrical lens that focuses light in one axial direction is used to change an aspect ratio of an image.

For example, as shown in FIG. 3, a cylindrical lens CL curved in the y-axis direction focuses light only in the y-axis direction to form an image I and thus the image I is narrow in the y-axis direction.

Figure 4:
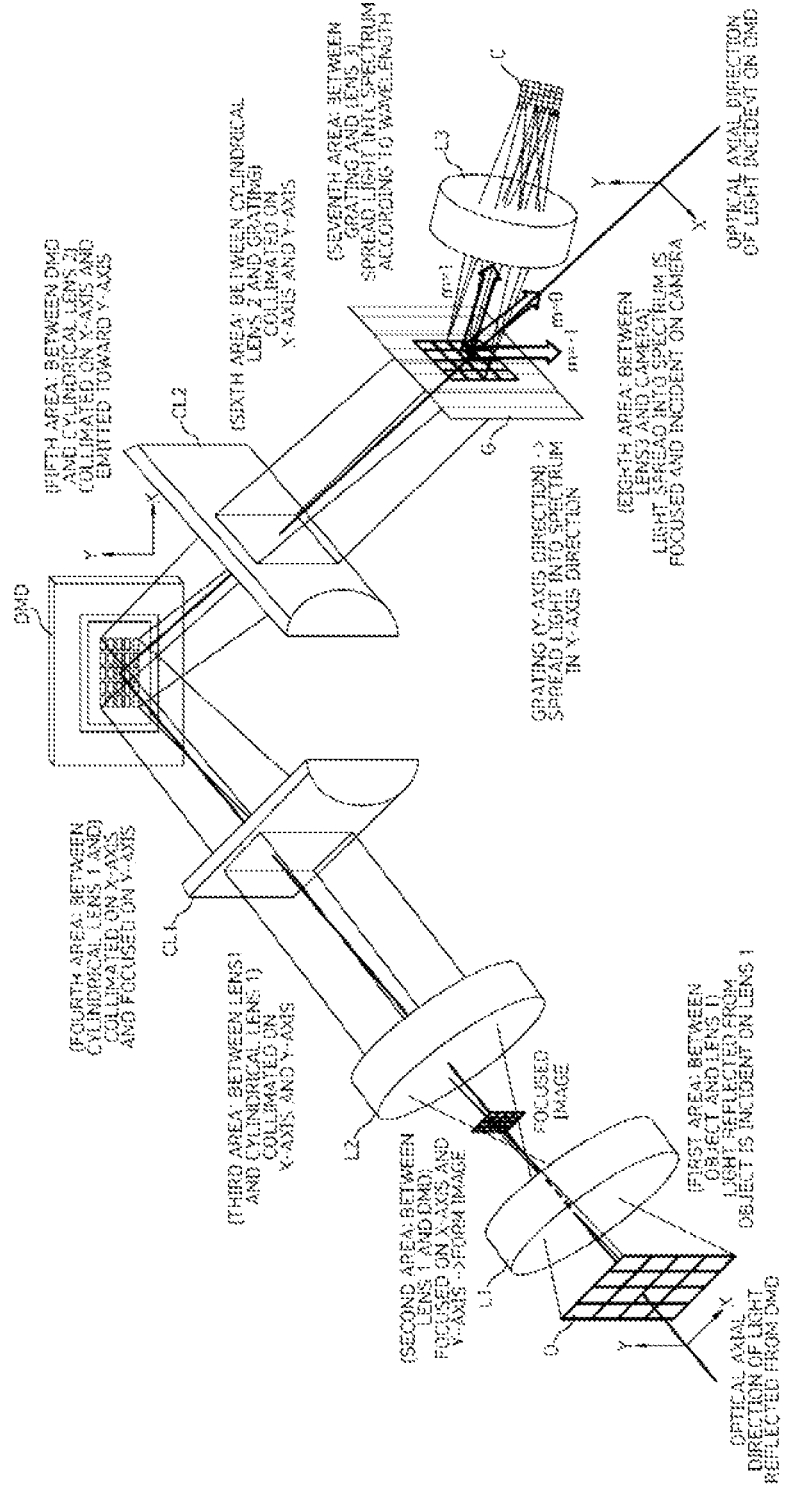
FIG. 4 illustrates a hyperspectral imaging system capable of improving spatial resolution using a cylindrical lens according to an embodiment of the present disclosure.

As shown in FIG. 4, in the hyperspectral imaging system according to the embodiment of the present disclosure, an image is formed from light reflected from an object O, which is to be measured, through a circular lens L1 (a second area), and light emitted after the formation of the image is collimated through a circular lens L2 with a shorter focal distance so as not to deviate from the size of a subsequent circular lens and to be incident on a cylindrical lens CL1 (a third area).

In this case, an axis (ay-axis) along which the cylindrical lens CL1 is curved is moved to be parallel with an axis (a y-axis) of a shorter side of a DMD, so that an image formed on the DMD may be long on an x-axis through collimation and may be short on the y-axis through focusing, thereby increasing the space utilization of an active area of the DMD (a fourth area).

The DMD may be programmed according to a line pattern (in a state in which only columns of several micromirrors are turned on and the other columns of micromirrors are turned off) and thus portions of an image formed on the DMD are sequentially reflected only by the micromirrors that are in the on-state.

When light is reflected from the DMD, the light is emitted on the y-axis and collimated on the x-axis (a fifth region).

Therefore, light emitted on the y-axis may be collimated again (a sixth area) when another cylindrical lens CL2 is placed in the same axial direction as the axis (the y-axis) about which the cylindrical lens CL1 is curved and is then adjusted to be in focus.

The light collimated on the x-axis and the y-axis is incident on the spectroscope G, is spread into a spectrum according to a wavelength (a seventh area), is focused again through a circular lens L3 and thereafter input to the camera C.

Each of the lenses L1 to L3, CL1, and CL2 shown in FIG. 4 may be a single lens or may be a compound lens that is a combination of multiple lenses for correcting aberration or adjusting image magnification or the like.

Figure 5:
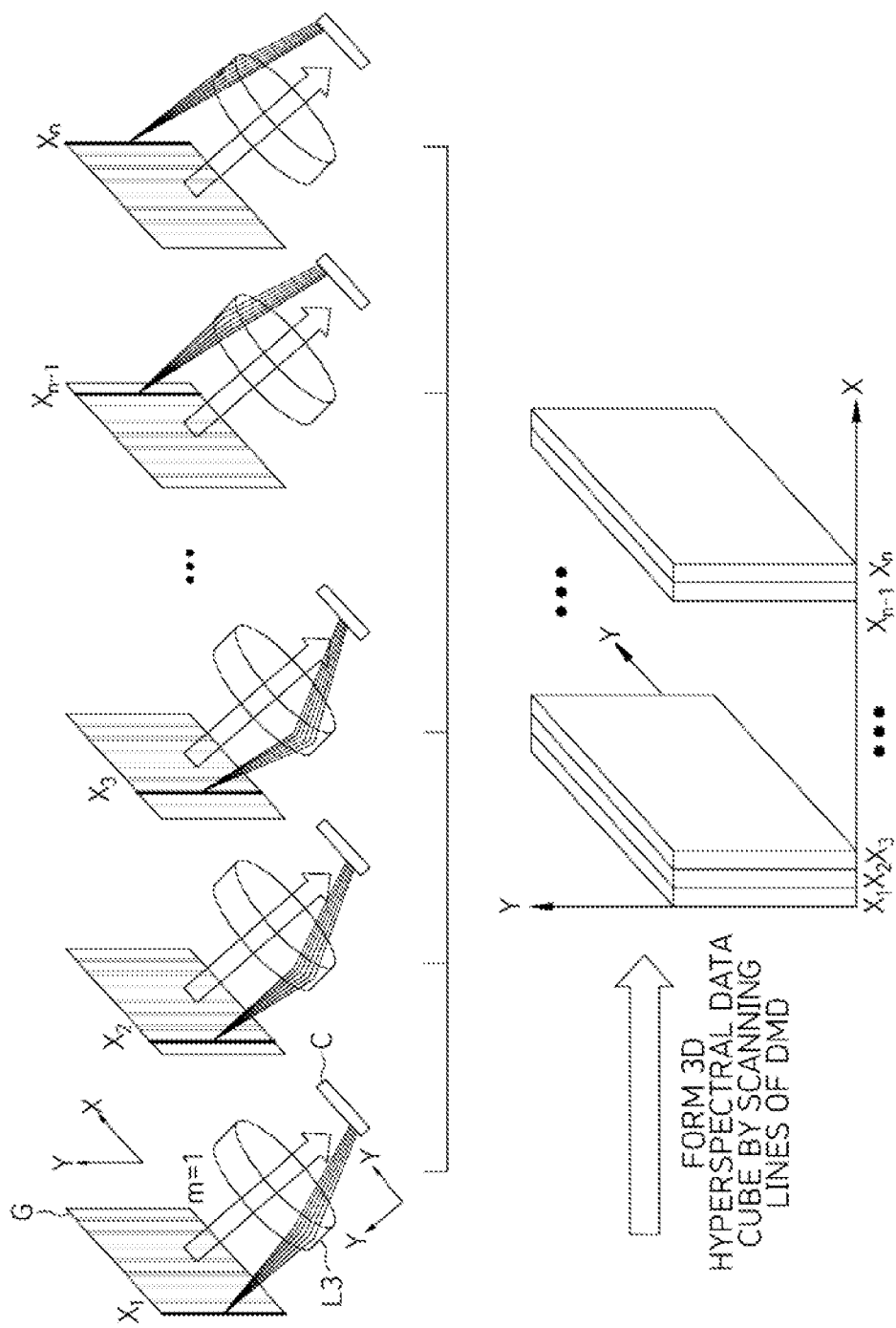
FIG. 5 illustrates a process of forming a three-dimensional (3D) hyperspectral data cube by scanning line patterns of a DMD according to an embodiment of the present disclosure.

FIG. 5 illustrates a process of forming a 3D hyperspectral data cube by scanning line patterns of a DMD according to an embodiment of the present disclosure.

When the line patterns of the DMD is scanned in a direction of an axis (an x-axis), only some lines of an image reflected from the DMD are collimated and incident on a spectroscope G.

In this case, a position of the image passing through the spectroscope G is changed to $x_1, x_2, x_3, \ldots, x_n, x_{n-1}$ as the line patterns are sequentially scanned, and light diffracted primarily by the spectroscope G is concentrated through a focusing lens 13 and delivered to a camera C (m=1 or −1 in FIG. 5).

Therefore, because data (y, λ) may be obtained for each of the line patterns of the DMD, when data of all the line patterns is collected, data (y, λ) on an x-axis of each of the line patterns may be collected to obtain a 3D hyperspectral data cube (x, y, λ).

In this case, because a scan direction of the line patterns should be the same as a spectral direction of a spectroscope, the scan direction of line patterns is set to be perpendicular to the direction of the groove in the spectroscope G as shown in FIG. 5.

Because the 3D hyperspectral data cube is formed according to the above process, detailed spatial information about an object to be measured may be obtained by increasing the magnification of an image formed on the DMD.

Therefore, the magnification of an image to be formed is increased according to a size of a longer side of the DMD (on an x-axis in FIG. 4) so that an image as large as possible may be formed in an active area of the DMD.

Accordingly, the sizes of portions of the image that are outside the active area in a direction of a shorter side of the DMD (the y-axis direction in FIG. 4) may be reduced through a cylindrical lens to increase the amount of spatial data to be obtained by scanning the line patterns of the DMD, thereby improving spatial resolution.

Figure 6:
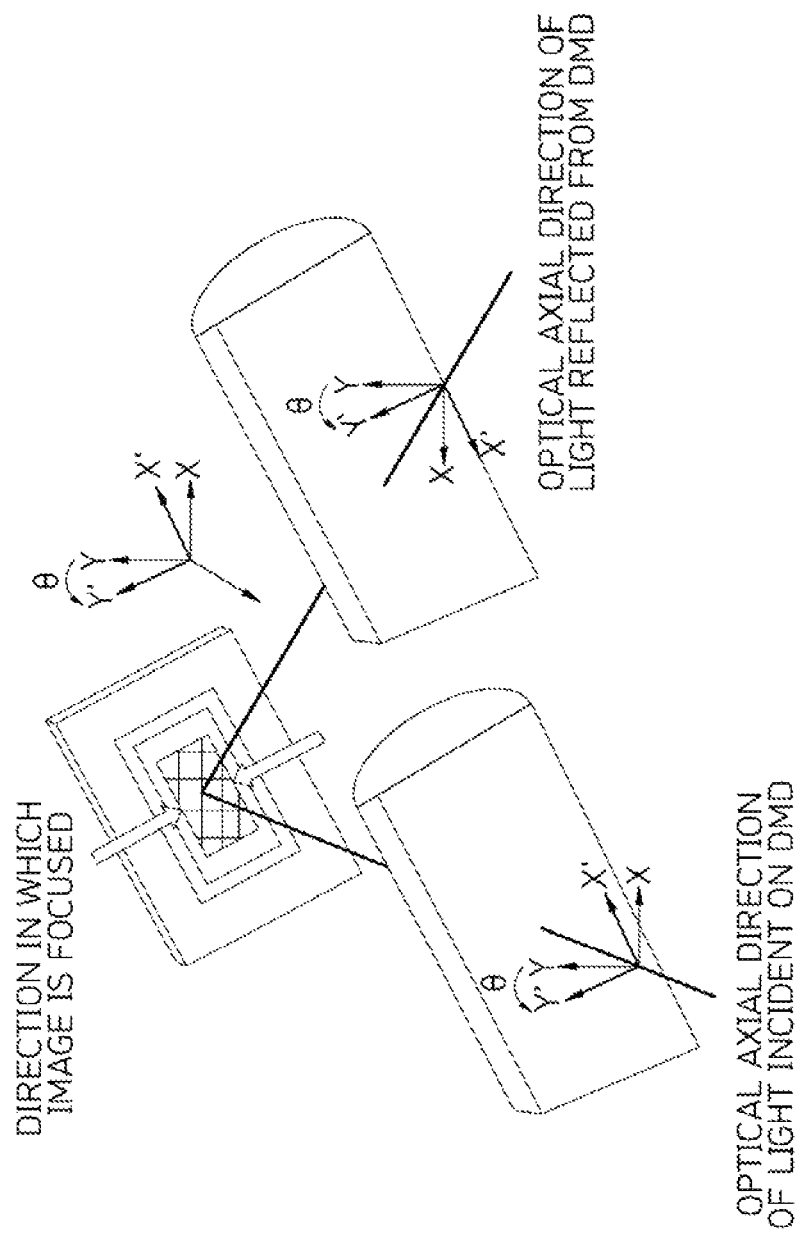
FIG. 6 illustrates an orientation of a cylindrical lens when a DMD is rotated with respect to an optical direction (a z-axis direction) according to the embodiment of the present disclosure.

FIG. 6 illustrates an orientation of a cylindrical lens when a DMD is rotated with respect to an optical direction (a z-axis direction) according to the embodiment of the present disclosure.

Generally, an active area of the DMD is rotated with respect to the optical direction (z-axis direction) when image data is obtained by turning on or off micromirrors of the DMD.

In this case, as shown in FIG. 6, the cylindrical lens may be rotated according to a rotational direction of the DMD to reduce the size of an image in a direction of a shorter side of the DMD.

An optical alignment method using an optical system capable of improving the spatial resolution of hyperspectral imaging according to an embodiment of the present disclosure includes (a) placing a first cylindrical lens having a curved shape and configured to focus and form an image on an axis corresponding to a shorter side of a DMD having a rectangular shape, (b) placing a second cylindrical lens curved in the same axial direction as the axis to collimate light reflected from the DMD, and (c) obtaining hyperspectral data by scanning line patterns of the DMD.

(c) may include sequentially reflecting portions of an image, which is formed by programming according to the line patterns, only by mirrors that are in the on-state.

(c) may include obtaining data in units of the line patterns and collecting the data for all the line patterns to obtain a 3D hyperspectral data cube.

The optical alignment method using the optical system capable of improving the spatial resolution of hyperspectral imaging according to the embodiment of the present disclosure may be implemented by a computer system or recorded on a recording medium. The computer system may include at least one processor, a memory, a user input device, a data communication bus, a user output device, and a storage. These components establish data communication with one another via the data communication bus.

The computer system may further include a network interface coupled to a network. The processor may be a central processing unit (CPU) or may be a semiconductor device configured to process instructions stored in the memory and/or the storage.

The memory and the storage may include various types of volatile or non-volatile storage media. For example, the memory may include a read-only memory (ROM) and a random access memory (RAM).

Accordingly, an optical alignment method using an optical system capable of improving the spatial resolution of hyperspectral imaging according to an embodiment of the present disclosure may be implemented as a method executable by a computer. Computer-readable instructions may be executed to perform, by a computer device, the optical alignment method using the optical system capable of improving the spatial resolution of hyperspectral imaging according to the embodiment of the disclosure.

The optical alignment method using the optical system capable of improving the spatial resolution of hyperspectral imaging according to the present disclosure may be embodied as computer-readable code recorded on a computer-readable recording medium. The computer-readable recording medium includes all types of recording media storing data that can be deciphered by the computer system. Examples of the computer-readable recording medium may include a ROM, a RAM, a magnetic tape, a magnetic disk, a flash memory, an optical data storage device, etc. Computer-readable recording media may be distributed in a computer system connected to a computer communication network to store and execute computer-readable code in a distributed manner.

According to the present disclosure, the magnification of an image to be formed on a DMD can be maximized by changing an aspect ratio of the image according to an aspect ratio of an active area of the DMD using a cylindrical lens, and the amount of spatial data to be obtained can be increased by scanning line patterns of the DMD to obtain detailed spatial information of an object to be measured, thereby improving the spatial resolution of hyperspectral imaging.

It should be noted that effects of the present disclosure are not limited thereto and other effects that are not mentioned herein will be clearly understood by those of ordinary skill in the art from the following description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An optical system for improving the spatial resolution of hyperspectral imaging, the optical system comprising:
   a digital micromirror device (DMD) having a rectangular shape;
   a first cylindrical lens curved to focus and form an image on an axis corresponding to a shorter side of the DMD; and
   a second cylindrical lens curved in the same axial direction as the axis to collimate light reflected from the DMD.

2. The optical system of claim 1, further comprising:
a first circular lens configured to form an image from light reflected from an object to be measured; and
a second circular lens configured to collimate light emitted after the formation of the image.

3. The optical system of claim 1, wherein the first cylindrical lens is curved in the axial direction to form an image that is narrow in the axial direction.

4. The optical system of claim 1, wherein the DMD is programmed according to line patterns such that portions of a formed image are sequentially reflected only from mirrors that are on.

5. The optical system of claim 1, wherein the DMD is programmed according to line patterns such that only columns of multiple micromirrors are turned on and the other columns of micromirrors are turned off.

6. The optical system of claim 1, further comprising a spectroscope configured to spread light collimated by the second cylindrical lens into a spectrum according to a wavelength when the light is incident thereon.

7. The optical system of claim 6, wherein only some lines of an image reflected from the DMD when the line patterns of the DMD are scanned in an axial direction are collimated and incident on the spectroscope.

8. The optical system of claim 7, wherein a direction of a groove in the spectroscope is perpendicular to a pattern scan direction.

9. The optical system of claim 7, further comprising:
a focusing lens configured to concentrate light diffracted by the spectroscope; and
a camera configured to receive the concentrated light,
wherein the camera collects data obtained for the line patterns of the DMD to obtain a three-dimensional (3D) hyperspectral data cube.

10. The optical system of claim 1, wherein, when an active area of the DMD is rotated in an optical axial direction, the first cylindrical lens and the second cylindrical lens are rotated according to the optical axial direction.

11. An optical alignment method using an optical system for improving the spatial resolution of hyperspectral imaging, the optical alignment method comprising:
(a) placing a first cylindrical lens curved to focus and form an image on an axis corresponding to a shorter side of a digital micromirror device (DMD) having a rectangular shape;
(b) placing a second cylindrical lens curved in the same axial direction as the axis to collimate light reflected from the DMD; and
(c) obtaining hyperspectral data by scanning line patterns of the DMD.

12. The optical alignment method of claim 11, wherein (c) comprises sequentially reflecting portions of an image, which is formed by programming according to the line patterns, only by mirrors that are on.

13. The optical alignment method of claim 12, wherein (c) comprises obtaining data in units of the line patterns and collecting the data for all the line patterns to obtain a three-dimensional (3D) hyperspectral data cube.

* * * * *